United States Patent
Clute

(10) Patent No.: US 7,690,688 B2
(45) Date of Patent: Apr. 6, 2010

(54) SAFETY BELT ROLL-UP MECHANISM HAVING A FORCE LIMITATION DEVICE ACTUATABLE AS A FUNCTION OF THE LENGTH OF BELT STRAP WITHDRAWN

(75) Inventor: Günter Clute, Elmshorn (DE)

(73) Assignee: Autoliv Development AB (SE)

( * ) Notice: Subject to any disclaimer, the term of this patent is extended or adjusted under 35 U.S.C. 154(b) by 725 days.

(21) Appl. No.: 11/583,293

(22) Filed: Sep. 1, 2006

(65) Prior Publication Data

US 2007/0145175 A1    Jun. 28, 2007

Related U.S. Application Data

(63) Continuation-in-part of application No. 10/478,933, filed on Dec. 22, 2003, now abandoned.

(51) Int. Cl.
*B60R 22/36* (2006.01)
(52) U.S. Cl. .................. 280/806; 280/807; 242/382; 242/382.2; 242/382.4
(58) Field of Classification Search .......... 280/805, 280/806, 807; 242/379.1, 382, 382.2, 382.4, 242/383.4, 383.5
See application file for complete search history.

(56) References Cited

U.S. PATENT DOCUMENTS 4,456,196 A * 6/1984 Takada et al. .............. 242/385
5,294,070 A * 3/1994 Sugano et al. ........... 242/382.2
5,887,814 A * 3/1999 Matsuki et al. .......... 242/379.1
6,405,959 B1 * 6/2002 Klingauf et al. ............. 242/374
6,499,554 B1 * 12/2002 Yano et al. .................. 180/268
6,641,076 B2 * 11/2003 Mori et al. ............... 242/382.2
6,641,078 B2 * 11/2003 Palliser ..................... 242/382.2
6,702,056 B2 * 3/2004 Tanaka et al. ............... 180/269
6,832,782 B2 * 12/2004 Mori .......................... 280/806

* cited by examiner

*Primary Examiner*—Toan C To
(74) *Attorney, Agent, or Firm*—Robert W. Becker; Robert W. Becker & Assoc

(57) ABSTRACT

A safety belt roll-up mechanism is provided, and includes a force limitation device that operates in a multi-stage manner and has a two-stage torque rod and a pyrotechnically operating switching device that couples the torque rod, in various clamping lengths, with a belt shaft. The extent of the belt strap unwound from the belt shaft is utilized for actuation of the force limitation device. A ratchet wheel is connected to the belt shaft via a reduction gear mechanism. A portion of the periphery of the ratchet wheel has a toothing for engaging the reduction gear mechanism. A further portion of the periphery of the ratchet wheel has a switching contour that rests against a contact pin of an electric switch. The switching contour has a profile that effects the connection or disconnection of the switching device for the torque rod.

2 Claims, 2 Drawing Sheets

SAFETY BELT ROLL-UP MECHANISM HAVING A FORCE LIMITATION DEVICE ACTUATABLE AS A FUNCTION OF THE LENGTH OF BELT STRAP WITHDRAWN

The present application is a continuation-in-part application of U.S. patent application Ser. No. 10/478,933 filed Dec. 22, 2003 now abandoned.

BACKGROUND OF THE INVENTION

The invention relates to a safety belt roll-up mechanism having a belt shaft that is mounted in a housing and serves as a carrier for a belt strap that can be wound onto and unwound from the belt shaft, whereby the belt roll-up mechanism is provided with a force limitation device that operates in a multi-stage manner and has a torque rod and a switching device that couples the torque rod, in various clamping lengths, with the belt shaft, and whereby the extent of the belt strap unwound from the belt shaft is utilized for the actuation of the force limitation device.

A safety belt roll-up mechanism having the aforementioned features is known from DE 27 27 470 A1. The known safety belt roll-up mechanism has a torque rod as a force limitation device that at its one end is fixedly connected to the shaft blocking mechanism, and at its other end is coupled to the belt shaft in such a way that even when the shaft blocking mechanism is triggered, the belt shaft, upon torsion of the torque rod, can still rotate further by a certain amount. Since the adjustment of the force limitation level should be effected as a function of, in particular, the size of a vehicle occupant, the known belt roll-up mechanism has a device for the continuous alteration of the clamping length of the torque rod, which clamping length, in one embodiment of the known belt roll-up mechanism, is to be controllable as a function of the length of the belt strap withdrawn by connecting a sliding sleeve, which fixes the clamping length, with the belt shaft via a gear mechanism.

Reference is further made to U.S. Pat. No. 6,616,081 (hereinafter "'081"), the disclosure of which is incorporated herein by reference. This patent discloses a known two-stage, force-limiting device, as well as a pyrotechnically operated force limiting device which is utilized in the present invention, as described below in detail.

According to the '081 patent, the control of the switching to the different clamping lengths of the torsion rod takes place in that the release of the belt band, caused by the effect of the force limiting device of the seat belt roll-up mechanism, is used as the gauge for ignition of the pyrotechnical switching device (FIG. 1 of '081). In this connection, a measuring device 37 is provided on the belt roll-up mechanism 10, for example in the form of a potentiometer, which determines the speed of the shaft rotations or the angular speed. If the measured value exceeds a threshold, this is identified as the beginning of the force limiting process, and the further belt release is determined via the potentiometer. Thus, '081 is based on a switching time point, which is provided or constructively determined during the occurrence of an accident, for example during the force limiting process.

The known safety belt roll-up mechanisms have the drawback that the sliding sleeve does not represent an adequate reliability for the fixing of the clamping length of the torque rod, and in addition, the mechanics for a continuous adaptation of the clamping length of the torque rod to the rotational speed of the belt shaft, and hence to the respectively existing belt strap withdrawal, is complicated.

BRIEF DESCRIPTION OF THE DRAWINGS

One embodiment of the invention is shown in the drawing, and will be described subsequently. In the drawing.

DETAILED DESCRIPTION OF THE PREFERRED EMDODIMENTS

In contrast to the device described in '081, discussed in detail above, the present invention is based on a completely different concept, in which at the outset, the force limiting level is based on the size of the occupant, because for larger vehicle occupants, a correspondingly larger force limiting level is required, while with smaller vehicle occupants, a correspondingly smaller force limiting level is desirable. In this regard, the present invention proposes taking into consideration the fastening process of the safety belt for determining the switching time point for the different clamping lengths of the torsion rod already, because large occupants require that more belt band be unwound from the seat belt roll-up mechanism than smaller occupants. Thus, by determining the roll-out length of the belt band, the switching time point for switching between the high and the low force limiting levels is determined. For this purpose, the present invention proposes a correspondingly designed gear assembly, which acts on an electric switch 17 with a switching contour 21.

Figure 1:
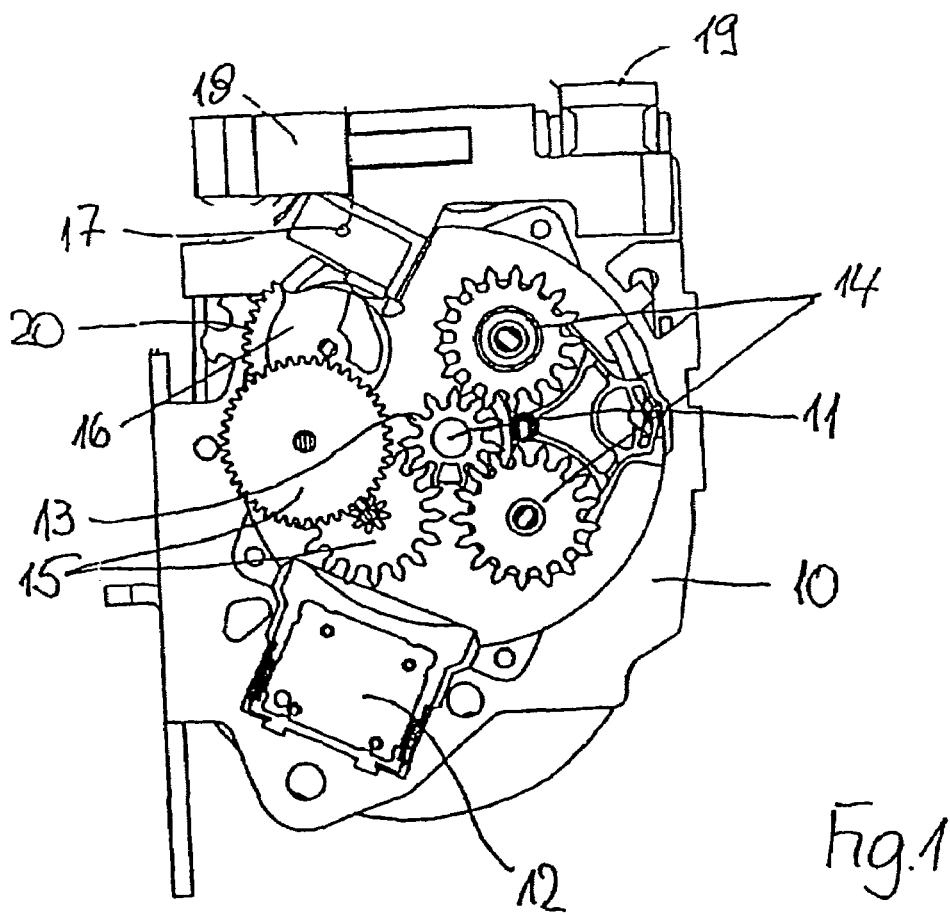
FIG. 1 shows in a side view the system side of a safety belt roll-up mechanism with control of the force limitation device, FIG. 2, in an enlarged view, shows the ratchet wheel as a component of the control.

A known belt winder or roll-up mechanism is provided with a U-shaped housing, in the lateral housing plates of which, of which one housing plate 10 can be seen in FIG. 1, there is mounted a belt shaft 11. As can be seen from FIG. 1, the belt shaft 11 is provided with a shaft gear wheel 13 that is fixedly connected therewith. Disposed on the lateral housing plate 10 is a sensor 12 that reacts to the vehicle, and the function of which, for self-blocking belt roll-up mechanisms, is adequately known from the state of the art.

Connected to the externally toothed shaft gear wheel 13 is a gear mechanism 14 that is comprised of a plurality of gears and by means of which the ALR-ELR changeover of a belt roll-up mechanism can be controlled, whereby this function also is not of importance for the explanation of the present invention, and can be selectively realized or not on an inventively embodied, self-blocking, roll-up mechanism.

Figure 2:
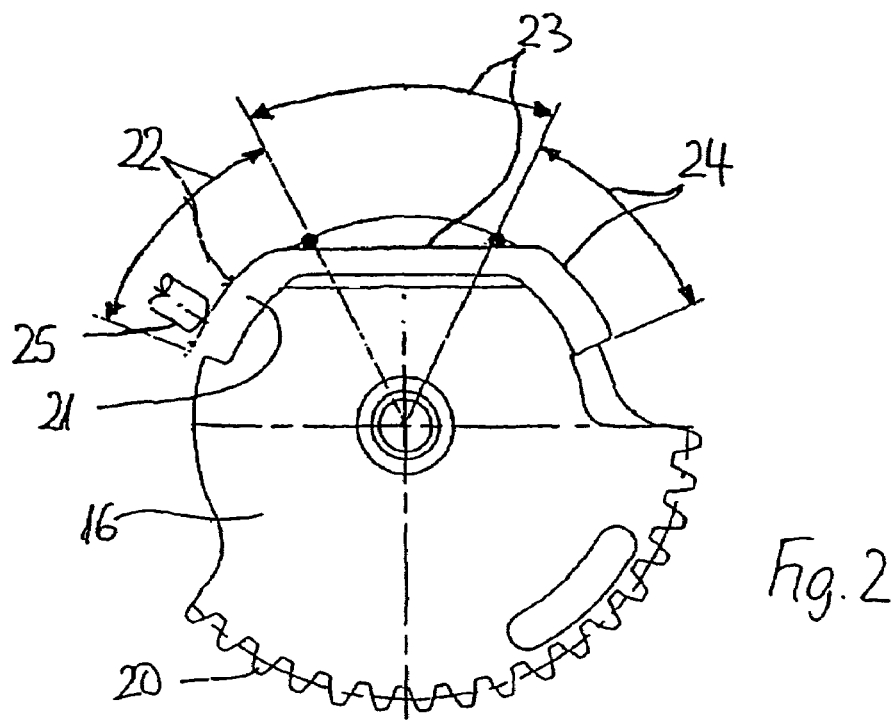

Important for the realization of the invention is that a reduction gear mechanism 15, that comprises two further gears, be connected to the shaft gear wheel 13; the reduction gear mechanism acts upon a ratchet wheel 16 that is rotatably mounted on the housing plate 10. For this purpose, the ratchet wheel 16 is provided with an external tooting 20 over a portion of its outer periphery. Associated with the ratchet wheel 16 is an electric switch 17, out of which projects a switching pin 25 that is illustrated in FIG. 2 and is guided on a switching contour 21 formed on the ratchet wheel 16, whereby the electric switch 17 is coupled with a switch housing 18 for the pyrotechnically operated switching device for adjusting the clamping length of the torque rod, which forms the force limitation device shown in FIGS. 3 and 4. The belt roll-up mechanism is furthermore provided with a connector 19 for an energy supply line coming from the vehicle.

As can be seen in the detailed view of FIG. 2, the switching contour 21, which is formed over a portion of the periphery of the ratchet wheel 16, has three. zones, namely a first zone 22, a second zone 23 and a third zone 24, whereby when the ratchet wheel 16 is pivoted, the stationary switching or contact pin 25 that rests against the ratchet wheel travels over these zones 22, 23, 24. In this connection, the arrangement of the ratchet wheel 16 is such that in the first zone 22, a position of the switching pin 25 is effected in which the electric switch 17 establishes a deactivation of the pyrotechnical switching device, so that if an accident is sensed, the pyrotechnical switching device is not triggered. This first zone 22 corresponds to a position of the belt shaft 11 where the belt strap is entirely or nearly entirely wound up, in other words, where the safety belt is not being worn or where the belt strap is withdrawn only slightly, and in this belt withdrawal position a triggering of the switching device is not required or not desired.

If the belt strap is unwound from the belt shaft 11 to an extent that corresponds to the strapped-in length of belt strap for smaller persons, the switching pin, with a belt strap unwound in such a manner, rests against the second zone 23 of the switching contour 21 of the ratchet wheel 16, and in this position the position of the switching pin 25 effects an activation of the triggering readiness or operation in such a manner that when an accident is sensed, the pyrotechnical switching device is now triggered and thereby the clamping situation of the torque rod is altered in such a way that a lower force limitation level results.

Finally, if so much belt strap is unwound from the belt shaft 11 that corresponds to the strapped-in length of larger vehicle occupants, the third portion or zone 24 comes to rest against the switching pin, and as a result the switching pin is brought into a position corresponding to that when it rests against the first portion 22, in which the triggering of the pyrotechnical device is deactivated, so that in the absence of actuation of the pyrotechnical switching device, the high force limitation level is maintained.

Figure 3:
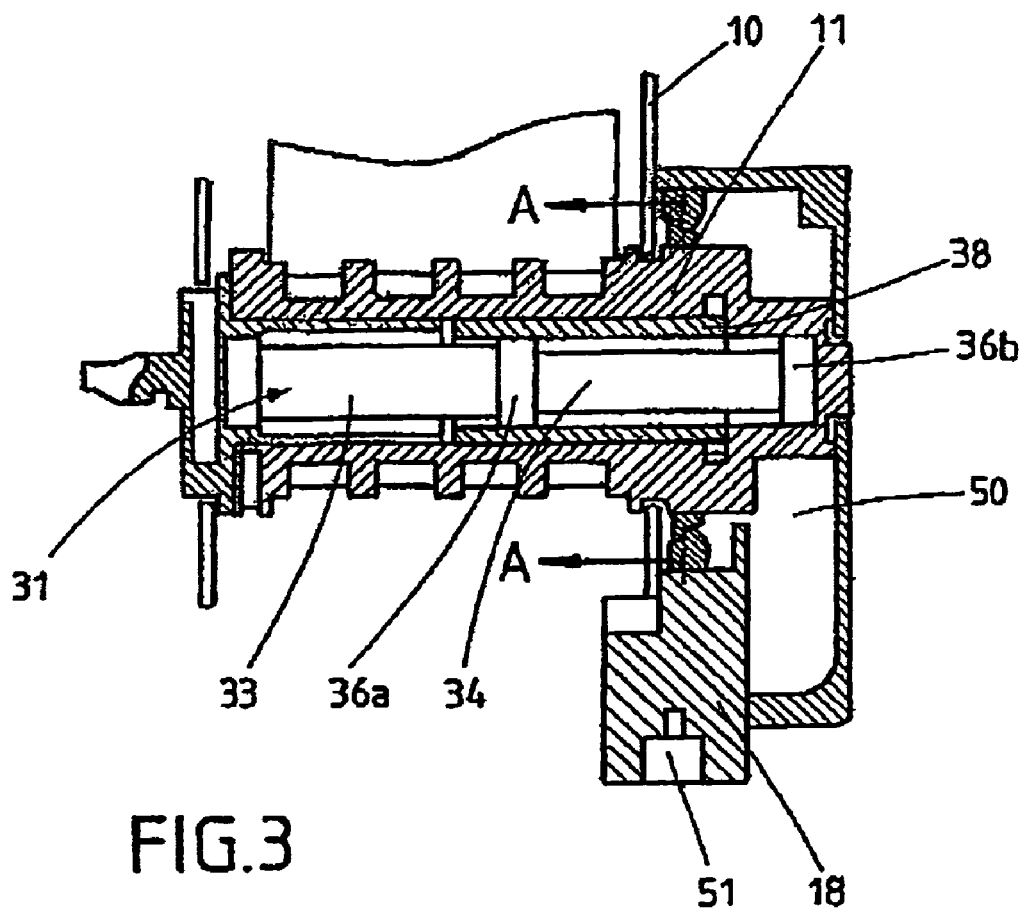
FIG. 3 shows a longitudinal view of a belt retractor with spool and a two-stage torsion bar with a switching device, which is utilized in the safety belt roll-up mechanism of the present invention.
Figure 4:
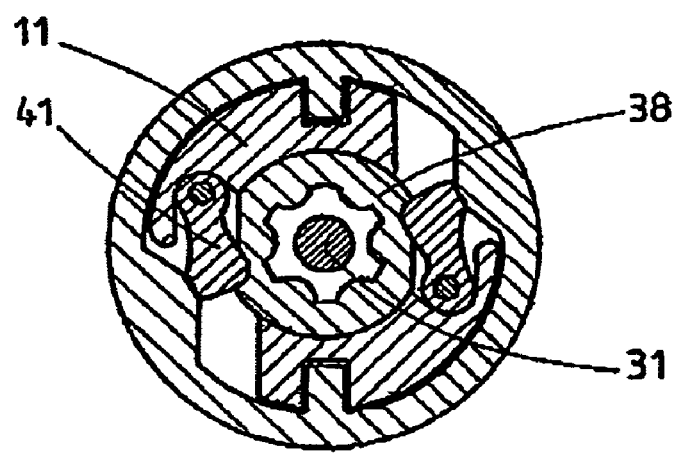
FIG. 4 shows the switching device in accordance with FIG. 3 in a frontal view along the line A-A.

FIGS. 3 and 4 show a belt retractor with spool and a two-stage torsion bar with a switching device from the '081 patent discussed above. FIGS. 3 and 4 of '081 are provided for the general purpose of illustrating the type of two-stage torsion bar and switching device utilized in the safety belt roll-up mechanism of the present invention, discussed above. FIG. 3 shows a chamber 50, in which the gear mechanism 14 of FIGS. 1 and 2 can be mounted. An ignition charge, or pyrotechnical drive 51 is shown in FIG. 3 as an example of a drive medium. FIG. 3 also shows the switch housing 18 of FIGS. 1 and 2, which cooperates with the electric switch 17. The switch housing 18 accommodates the individual switch elements according to FIG. 4, including the pyrotechnical drive 51.

A two-stage torsion rod 31 has a section 33 with a larger cross section and a section 34 with a narrower cross section, whereby between sections 33, 34 and on the outer end of the section 34, a connection piece 36 a, b is provided, by means of which the coupling of the belt shaft 11 with the respective section 33 or 34 of the torsion rod 31 takes place. When the belt shaft 11 is coupled with the section 33 of the torsion rod 31 having the larger cross section, a higher force limiting level exists, while with the coupling of the belt shaft 11 with the section 34 of the torsion rod 31 having the smaller cross section, a lower force limiting level exists. Switching between the two force limiting levels occurs via a torque tube 38, which is oriented for connection of the belt shaft 11 with the section 33 of the torsion rod 31 having the larger cross section.

The switching itself (both in '081 and the present invention) is effected via the pyrotechnically operated pawl 41, which couples the belt shaft 11 with the torque tube 18 and thereby adjusts the higher force limiting level; if the pawls 41 are not controlled, the lower force limiting level is provided, based on the connection of the belt shaft 11 with the section 33 of the torsion rod 31 having the smaller cross section.

The features of the subject matter of these documents disclosed in the preceding description, the patent claims, the abstract and the drawing can be important not only individually but also in any desired combination with one another for the realization of the various embodiments of the invention.

The specification incorporates by reference the disclosure of German priority document 201 09 114.3, filed May 31, 2001 and PCT/EP02/05765, filed May 25, 2002.

The present invention is, of course, in no way restricted to the specific disclosure of the specification and drawings, but also encompasses any modifications within the scope of the appended claims.

The invention claimed is:

1. A safety belt roll-up mechanism comprising:
   a housing;
   a belt shaft that is mounted in said housing and serves as a carrier for a belt strap that can be wound onto and unwound from said belt shaft;
   a force limitation device that operates in a multi-stage manner and has a two-stage torsion rod and a pyrotechnically operating switching device that couples the torsion rod, in various clamping lengths, with said belt shaft, wherein an extent of belt strap unwound from said belt shaft is utilized for an actuation of said force limitation device;
   a reduction gear mechanism;
   a ratchet wheel that is connected to said belt shaft via said reduction gear mechanism, wherein said ratchet wheel is provided over a portion of a periphery thereof with a toothing for engagement with said reduction gear mechanism; and
   an electric switch that is connected to said switching device for said torque rod, and that has a contact pin, wherein said ratchet wheel is provided over a further portion of its periphery with a switching contour that rests against said contact pin of said electric switch, and wherein said switching contour has a profile that effects a connection or disconnection of said switching device for said torsion rod.

2. A safety belt roll-up mechanism according to claim 1, wherein said switching contour, proceeding from a position of said ratchet wheel that is provided when said belt strap is essentially entirely wound up, has a first portion for a contact of said contact pin, which in this position effects a deactivation of a triggering of said pyrotechnical switching device, has a second portion that adjoins said first portion and that, upon rotation of said belt shaft, is traveled over by said contact pin, whereby in a position of said contact pin where it rests against said second portion of said switching contour, said pyrotechnical switching device can be triggered, and has a third portion that adjoins said second portion and serves for contacting said contact pin, wherein said contact pin, when it is in its position where it rests against said third portion of said switching contour, deactivates the triggering of said pyrotechnical switching device.

* * * * *